Nov. 1, 1927.

A. B. BRACKBILL

FARM GATE

Filed June 14, 1926

1,647,123

INVENTOR
Amos B. Brackbill
BY
John J. Thompson
ATTORNEY

Patented Nov. 1, 1927.

1,647,123

UNITED STATES PATENT OFFICE.

AMOS B. BRACKBILL, OF GAP, PENNSYLVANIA.

FARM GATE.

Application filed June 14, 1926. Serial No. 115,997.

This invention relates to a farm gate of that class which are hung upon hinges and which swing between posts in the usual manner.

The object of the invention is to provide a gate of this kind that can be made and shipped to the user in a knocked-down condition, and easily erected by the user.

Another object of the invention is to construct a non-sag gate, which can be adjusted to take up any sag, or which can be set at a slight angle.

A still further object being to provide a gate so made that the hinges can be adjusted to raise or lower the gate as well as to adjust its angle and distance from the post to which it is hung.

Also by a novel means the braces and rails of the gate are clamped together in such a manner as to hold the same in a secure manner at all times.

With these and other objects in view, my invention consists in certain construction and combination of parts as will hereinafter be fully described and claimed and illustrated in the accompanying drawings which form a part thereof and in which like figures of reference refer to corresponding parts in all of the views, and it is fully understood that slight changes may be made without departing from the spirit of the invention.

In the drawings:—

Referring to the drawings:—

Figure 1:
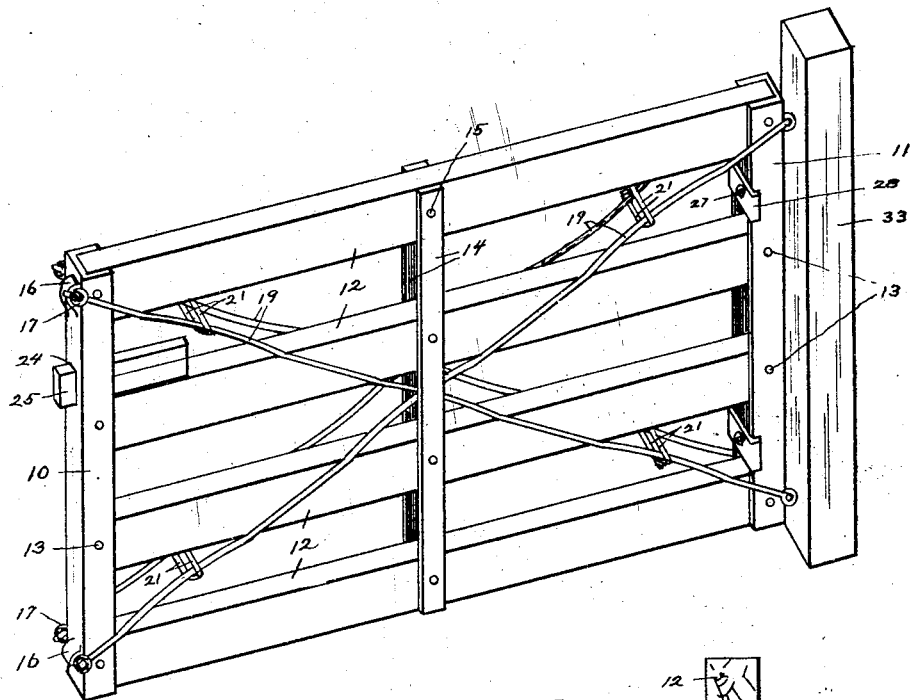
Figure 1 is a perspective view of a gate showing my construction.

The gate comprises the two ends 10 and 11 which are formed of channel iron, and the rails 12 which are of wood, and which have their ends entering said channels and secured therein by the bolts 13 passed therethrough; said rails 12 being further secured by the two vertical bars 14, which are placed in either side of the rails 12 and secured together and to said rails 12 by the bolts 15 passed therethrough.

Figures 2, 3:
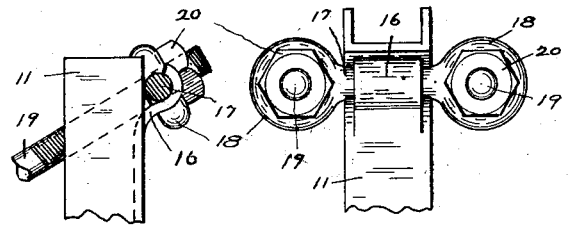
Figure 2 is a partial view of one of the upper corners showing in detail the rear stay rod and clip.
Figure 3 is an end view of the same, but showing the upper ends of both stay rods.
Figure 4:
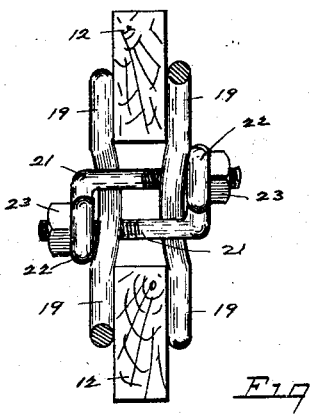
Figure 4 is a partial cross sectional view of two adjacent rails and the manner in which the stay rods are secured together.

The channels 10 and 11, near their ends have their back portion cut down as shown in Figures 2 and 3, to form a tongue 16, which is bent in the form of a hook to retain the clip 17 in place.

Said clips 17 are formed with two eyes 18 through which are passed the ends of the stay rods 19, which are placed as shown in Figure 1 and which are secured by the nuts 20, or one end of each rod may be formed with a hook to engage the eye 18.

In this manner by adjustment of these stay rods 19 the gate may be made up square, or at an angle, and any sag may be removed.

To clamp the rods 19 and the rails 12 in a secure manner in the position desired, there are provided the clips or clamps which comprise two eye bolts 21 which have the eyes 22 bent at right angles thereto, in such a manner that the body of one bolt 21 will pass through the eye 22 of the other bolt, and the two will embrace the two crossed stay rods 19 on either side of the rails 12 and by the nuts 23 said clamps will pull the rods 19 together and clamp the rails 12 between, thus producing a very rigid construction of gate and yet one that can readily be assembled by the user.

The end channel 10 is provided with a rectangular opening 24 adjacent to the top of one of the rails, and through which may be operated the latch 25 of the gate in the usual manner.

Figure 5:
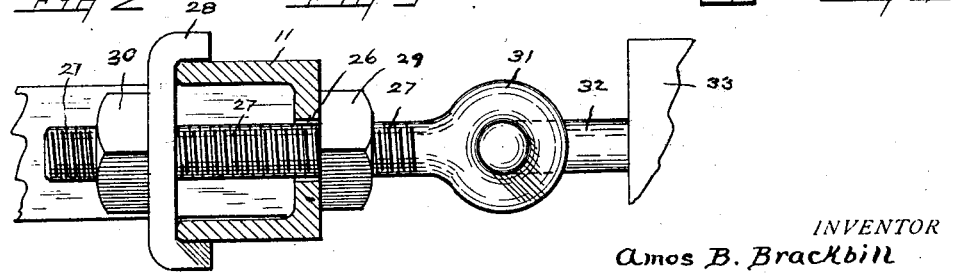
Figure 5 is a horizontal sectional view of one of the end channels, showing the method of mounting the hinges.

The other end channel 11 is provided with the elongated holes 26 through which the threaded portion of the hinge member 27 is placed (see Figure 5) and wherein it is secured in an adjustable manner by the clamp 28 which embraces the legs of the channel 11, and is held in a clamped position by the nut 29 threaded on the hinge member 27 in contact with the channel 11 and the nut 30 threaded on said member 27 in contact with the clamp 28.

In this manner it will be seen that by the position of the nuts 29 and 30 on the hinge member 27 that the channel 11 may be placed in any relation to the eye 31 of the hinge member 27 and the hinge member 32 secured to the post 33; and in this manner the gate may be placed in any position and any sag taken up by drawing up on the upper hinge.

Also by moving the hinge members 27 up or down in the elongated holes 26 the gate may be raised or lowered with relation to the post 33, thus providing a gate which is adjustable in all ways, and of very strong construction.

Having thus described my invention, what I claim as new and desire to secure by Letters Patent, is:

1. A gate of the class described, in combination with channel ends and a series of rails secured therein, of a tongue formed on said channels near the ends thereof, clips secured therein, and diagonal brace rods secured in said clips.

2. A gate of the class described, in combination with channel ends and rails secured therein, of tongues formed on said channels near the ends thereof, clips having eyes and secured by said tongues, and cross braces embracing the sides of the rails and having their ends secured in said clips in an adjustable manner.

3. A gate of the class described, in combination with a pair of channels having rails secured therein, of clips secured to said channels near the ends thereof, cross brace rods having their ends secured in said clips, and a series of clamps securing said rods together between the rails for the purpose of clamping the same.

In testimony whereof I hereunto affix my signature.

AMOS B. BRACKBILL.